June 2, 1936. G. J. HENRY 2,042,845
VALVE
Original Filed Dec. 5, 1931
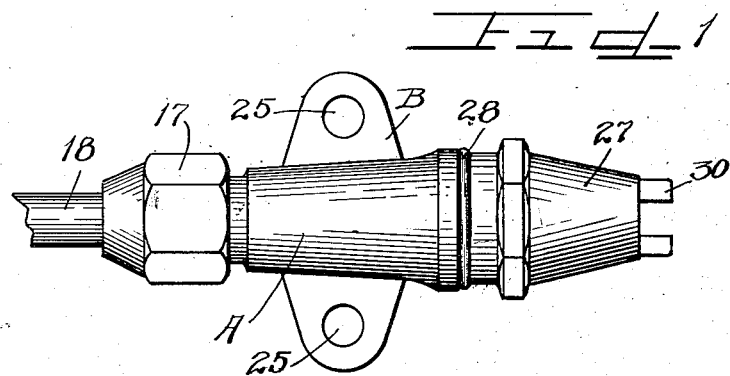
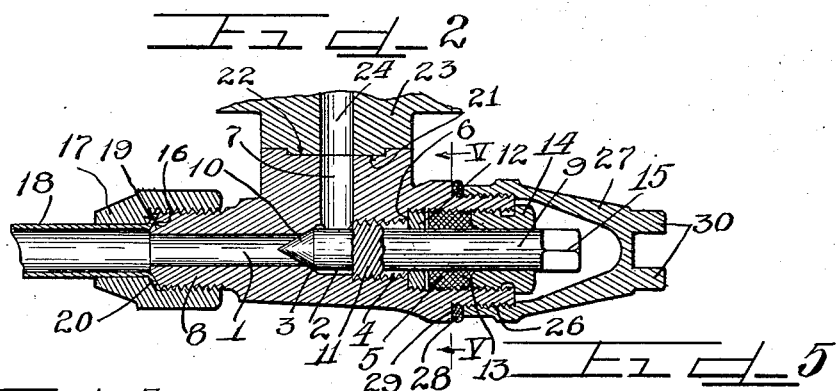
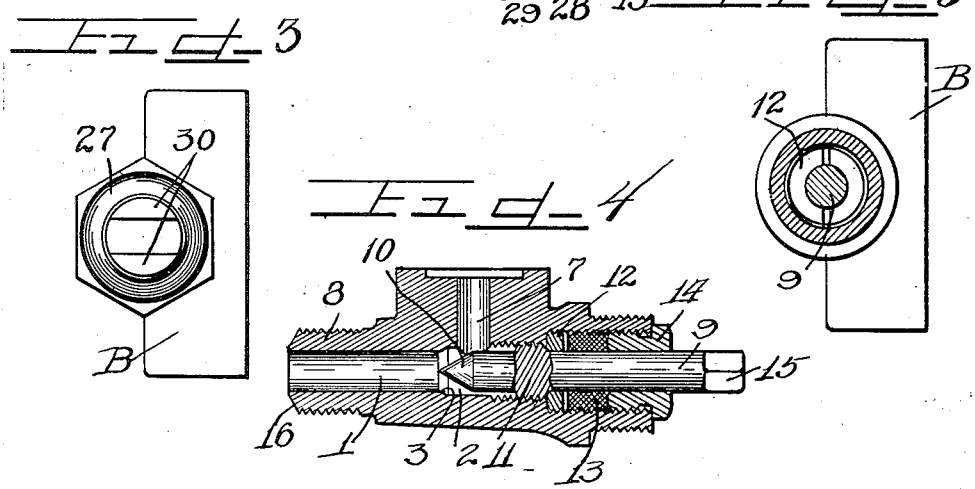
Inventor
Guy J. Henry Patented June 2, 1936

2,042,845

UNITED STATES PATENT OFFICE 2,042,845

VALVE

Guy J. Henry, Chicago, Ill.

Application December 5, 1931, Serial No. 579,164
Renewed August 6, 1934

4 Claims. (Cl. 251—50)

This invention relates to a valve and particularly to a novel valve for use in pipe lines for dangerous or obnoxious liquids, such as ammonia, methyl chloride, sulphur dioxide, and the like, and is especially useful in refrigerating systems in the pipes conveying the refrigerant.

The refrigerant used in refrigerating systems is in many instances dangerous and obnoxious and leakage of this liquid must be prevented in order that no fumes may escape to the atmosphere, as such fumes are oftentimes harmful to health. A valve for use in refrigerating systems must be one that can be connected to the pipe lines in such manner as to prevent leakage at the connection, as well as by the valve stem, and must be so constructed as to eliminate all danger of breakage when inserting a valve in a pipe line of this character.

The valve of this invention is made as a single metal casting having a plurality of connections for attachment to pipe lines. The body of the valve is bored from one end and the bores, valve seats, and the like, are formed in such manner that all of the same are concentric resulting in a leak tight valve. The valve stem and its associated parts are assembled in the valve body from one end thereof leaving the opposite end an integral part of the valve body casting for receiving a pipe.

An object of the invention is to provide a valve having a cast or forged metal body and with the passages therethrough concentric and so arranged as to allow valve assembly from one end.

Another object of the invention is to provide a valve having two seating portions cooperating with spaced seats and in which the parts are all assembled from the same end of the body.

A further object of the invention is to provide a valve having two seating portions wherein the stem may be packed and repacked without having to shut off the flow of liquid through the valve.

A still further object of the invention is to provide a valve in which the branch connections are integrally formed and strong enough to eliminate breakage thereof in connecting said valve in a pipe line.

A yet further object of the invention is to provide a valve having a single valve stem with integrally formed seating portions thereon for selectively cooperating with spaced seats.

A still further object of the invention is to provide a valve which is strong, sturdy and durable, which is economical to manufacture, which is efficient and certain in use and leak proof.

The above, other and further objects of the invention will be apparent from the following description, accompanying drawing and appended claims.

One form of the invention is illustrated in the accompanying drawing and the views thereof are as follows:

Figure 1 is a front elevational view of a valve embodying this invention.

Figure 2 is a longitudinal section through the valve of Figure 1 taken in a plane perpendicular to the paper.

Figure 3 is an end view looking at the right hand end of Figure 1.

Figure 4 is a sectional view similar to Figure 2 with the connections and valve stem cap removed.

Figure 5 is a section on line V—V of Figure 2.

As shown on the drawing:

The valve body A is of cast or forged metal, such as brass, bronze, or the like, and is provided with an integral block B at the rear side thereof which block is somewhat elliptical in plan. The body A is axially bored to provide at the end which in the present instance will be called the discharge end, with a cylindrical bore 1, an intermediate bore 2 of greater diameter than the bore 1, with the walls joining said bores being inclined at 3 providing a valve seat. A threaded bore 4 rearwardly of the bore 2 and of greater diameter than the bore 2 is formed at the same time the bores 1 and 2 are formed. Another and larger threaded bore 5 is formed at the cap end of the body with the walls between the bores 4 and 5 providing a radial shoulder 6. A single tool may form at one operation the bores 1, 2, 4 and 5 and then the bores 4 and 5 may be threaded subsequently to the formation of the same.

The block B in the present instance is shown as provided with a lateral cylindrical bore 7 communicating with the bore 2 of the valve body.

The discharge end 8 of the valve body A is reduced in diameter and exteriorly threaded.

An integral valve stem 9 having a diameter greater than that of bore 1 but less than the diameter of the bore 2 is formed with a pointed end 10 which serves as the valve for engaging the seat 3 to close passage between bore 1 and bore 7 when said stem is moved against said seat 3.

The stem 9 is provided with an integral enlargement 11 which is exteriorly threaded to engage the threaded bore 4 and move the stem axially when the same is turned.

The valve stem is inserted in the valve body A through the cap end of the body by having its threaded enlargement 11 brought into threaded engagement with the threaded bore 4. A ring 12 is then screwed into the threaded bore 5 and brought to rest against the radial shoulder 6, at the end of the enlarged portion 11.

The rear portion of the enlargement 11 is cambered so as to serve as a back seating valve for seating against the inner surface of the ring 12 when the stem is retracted to the right as may be seen in Figure 4.

Packing 13 is then inserted in the threaded bore 5 about the stem 9 and against the ring 12 so as to make a leak proof packing at this point. The packing 13 is held in position by a threaded nipple 14 which is threaded into the bore 5 and is provided with a central aperture for receiving the stem 9. The length of the stem 9 is such as to extend beyond the end of the nipple when the same is in position in the bore 5. The outer end of the stem 9 is provided with a polygonal end portion 15 for the reception of a suitable tool for moving the valve stem 9 axially to open and close the passage through the valve body A.

The outer end of the discharge end 8 of the valve body is cambered at 16. A fitting 17 threaded on the interior thereof engages the threaded end 8 of the valve body.

A pipe 18 is connected to the discharge end 8 of the valve body by having the end thereof flared at 19 and seated in the fitting 17 against an inclined seat 20, the inclination of which is the same as the camber 16 of the end of the valve body. The pipe 18 is then secured to the discharge end of the valve body by screwing the fitting 17 onto the end 8 of the body and tightening the same thus gripping the flared end 19 of the pipe tightly between the cambered surfaces 16 of the valve body and 20 of the fitting 17, thereby making a leak tight connection and eliminating any chance of breakage or cracking the pipe in its connection to the valve.

The outer face of the block B is in the present instance provided with a central depression 21 for receiving a similar projection 22 of a connection 23. The connection 23 is shown as a metallic block with a central bore 24 which registers with the lateral bore 7 in the valve body A when the parts are assembled and the valve is connected in the pipe line. The valve is fastened in position against the connection 23 by bolts, not shown, passing through properly disposed apertures 25 in the block.

The outer end of the cap end of the valve body is threaded to receive a cap 27 which is usually provided with valves of this character to prevent the escape of gases which perchance pass the packing 13. A washer 28 is interposed between the end of the cap 27 and an external shoulder 29 on the valve body for the purpose of increasing the sealing effect between the cap 27 and the valve body.

The cap 27 in the present instance is provided with outwardly extending lugs 30 spaced and shaped to engage the polygonal end 15 of the valve stem to serve as a handle or wrench for manipulating the stem.

Figure 2 of the drawing shows the position of the parts when passage between the lateral opening 7 and the discharge opening or bore 1 is closed by reason of the valve 10 engaging the seat 3 in the valve body.

Should it so happen that leakage occurs by the packing 13, then this may be replaced by turning the valve stem 9 outwardly so that the enlargement 11 seats against the ring 12 as shown in Figure 4 thus sealing the passage by the ring at this point whereupon the nipple 14 may be removed and the packing 13 replaced.

It will be observed that a valve constructed in accordance with this invention is sturdy, is leak tight and is arranged so that the openings or bores through the valve body with the exception of the lateral passage 7, are concentric and are all formed from the same end of the body and that the valve stem and its associated parts may be assembled from the same end of the valve body. This construction makes possible an economical valve which is highly efficient in use and which is leak tight.

The valve per se, it will be noted, is a valve having two seating portions for selectively engaging with spaced seats.

The cap 27 is provided with polygonal surfaces for the reception of a suitable tool to tighten the same if desired.

The beveled end of the enlargement 11 is beveled below the root of the thread in order to effect full seating action against the ring 12. The bore of the ring 12 is slightly greater than the diameter of the stem 9 so as to center the valve 10 in its seat 3.

It is within the contemplation of this invention to substitute in place of the block B a threaded lateral connection similar to the end 8 of the valve body and to fasten a pipe thereto in the same manner that the pipe 18 is secured to the end 8 of the body, that is by a fitting 17 engaging the end of the pipe between the fitting and the extension of the valve body.

The valve cap 27 having the projections 30 for operating the valve stem 9 is similar to the cap set forth in my copending application Serial No. 315,849, filed October 29th, 1928.

The gist of the invention resides in the provision of a metallic valve body which is bored from end to end with a plurality of bores of various diameters, certain of which are threaded and all of which are formed from the same end of the body, together with a valve stem constituting a double acting valve inserted in the body from the same end of the body, and the packing and assembly of the valve being effected from the same end.

The invention has been described herein more or less precisely, yet it is to be understood that changes may be made in the arrangement and proportion of parts and that equivalents may be substituted, without departing from the spirit and scope of this invention.

The invention is claimed as follows:

1. A valve structure comprising an elongated body having an opening along its length and a lateral opening communicating with said first opening, said first opening being formed with four portions having different diameters progressively bored, the bores of greatest and next greatest diameters being threaded, a first valve comprising a portion of said body defining a valve seat and a valve stem member movable in said first opening, a second valve comprising an enlarged intermediate part of said stem of greater diameter than the balance of said stem and cooperable with a ring in threaded engagement with the bore of greatest diameter, said ring being disposed against the end of the bore of next greatest diameter to provide a valve seat for said enlarged portion of said stem, said enlarged part of said stem being in threaded engagement with the bore of the next greatest diameter, packing material about said stem in the bore of greatest diameter, and a nipple threaded into said bore to maintain said packing tightly against said ring, said lateral opening communicating with said first opening at the bore of next smallest diameter, said valve stem being applied in said first opening with one of its ends adjacent the junction of the smallest bore with the bore of next greater diameter and movable towards and away from said junction by rotation of said member, said enlarged part of said stem and said ring being adapted for engagement to prevent the escape of gas when said packing material is removed.

2. A valve structure including a forward seating valve and a back seating valve, said structure comprising an elongated body having an opening extending inwardly from one end thereof and a lateral opening communicating with said first mentioned opening, said first opening being formed with portions of different diameters progressively bored, the bore of the greatest and the bore of the adjacent next greatest diameters being threaded, a valve and valve stem member having an intermediate part of greater diameter than the balance of said stem which intermediate part is threaded and is in engagement with the threaded bore of next greatest diameter, said member being applied in said opening with one of its ends adjacent the junction of the smallest bore with the bore of next greater diameter and movable towards and away from said junction by rotation of said member, said junction serving as a valve seat for the end of said member, a ring in the thread of said greatest bore and disposed against the end of the bore of next smaller diameter and being adapted to form a valve seat for the intermediate enlargement of said valve stem member when said member is moved away from the bore of least diameter to its limit of movement of such direction, packing material about said stem in the bore of greatest diameter, and a nipple in threaded engagement with said body to maintain said packing tightly against said ring, said lateral opening communicating with the bore of next smallest diameter, the engagement of said intermediate enlargement with said ring preventing gas escape from said valve structure when said packing material is removed.

3. A back seating valve structure including a valve casing having an opening extending inwardly from one end thereof which opening is formed of a series of bores of progressively decreasing diameter inwardly, said casing having a fluid opening communicating with the bore of smallest diameter and another opening communicating with the bore of next smallest diameter, said casing having a first valve seat between said last named bores, a valve adapted to be moved in one direction to engage said first seat and thereby close communication between said openings, a valve stem carrying said valve and projecting towards said one end of said casing, means for reciprocating said valve stem and valve, a member threaded into one of the bores and surrounding said stem and being adapted to form a second valve seat engageable by said valve when said valve is moved in an opposite direction of movement, and packing material about said stem within the bore of greatest diameter, and a threaded nipple adapted to maintain said packing material tightly against said second valve seat member, the engagement of said valve with said second valve seat preventing gas escape from said valve casing when said packing material is removed.

4. A back seating valve structure comprising a body having an opening extending inwardly from one end thereof, means in said body defining a first valve seat, a valve stem movable in said body in one direction of movement and carrying valve means to engage said seat and thereby prevent movement of fluid in one direction through said opening, a second valve seat means, said means comprising a ring member in said opening and in threaded engagement with said body, said valve stem being positioned extending through said ring member, packing means in said opening pressed against said ring member, and valve means on said valve stem adapted to have seated engagement with said ring and thereby prevent movement of fluid in an opposite direction through said opening when said valve stem is moved in an opposite direction, and whereby said packing may be removed without escape of fluid through the space normally occupied by said packing, said ring member being sealed in said body to prevent fluid passage past said member when said member is engaged by said valve means.

GUY J. HENRY.